United States Patent
Dutta et al.

(10) Patent No.: US 12,340,113 B2
(45) Date of Patent: Jun. 24, 2025

(54) HOST CONTROLLED GARBAGE COLLECTION IN A SOLID STATE DRIVE

(71) Applicant: SK hynix NAND Product Solutions Corp., San Jose, CA (US)

(72) Inventors: Bishwajit Dutta, Hillsboro, OR (US); Anand S. Ramalingam, Portland, OR (US); Sanjeev N. Trika, Portland, OR (US); Pallav H. Gala, Hillsboro, OR (US)

(73) Assignee: SK hynix NAND Product Solutions Corp., Rancho Cordova, CA (US)

( * ) Notice: Subject to any disclaimer, the term of this patent is extended or adjusted under 35 U.S.C. 154(b) by 815 days.

(21) Appl. No.: 17/214,819

(22) Filed: Mar. 27, 2021

(65) Prior Publication Data
US 2021/0216239 A1    Jul. 15, 2021

(51) Int. Cl.
*G06F 3/06* (2006.01)
*G06F 12/02* (2006.01)

(52) U.S. Cl.
CPC ........ *G06F 3/0655* (2013.01); *G06F 3/0604* (2013.01); *G06F 3/0679* (2013.01); *G06F 12/0253* (2013.01); *G06F 2212/7205* (2013.01)

(58) Field of Classification Search
CPC ...... G06F 3/0679; G06F 3/061; G06F 3/0652; G06F 2212/7203
See application file for complete search history.

(56) References Cited

U.S. PATENT DOCUMENTS

| | | | |
|---|---|---|---|
| 2012/0005405 A1 | 1/2012 | Wu et al. | |
| 2013/0297907 A1* | 11/2013 | Ki | G06F 3/0679 711/170 |
| 2014/0215129 A1* | 7/2014 | Kuzmin | G06F 12/0246 711/103 |
| 2014/0240335 A1* | 8/2014 | Hu | G06F 12/0871 345/543 |
| 2016/0103617 A1 | 4/2016 | Kang et al. | |
| 2016/0210060 A1 | 7/2016 | Dreyer | |
| 2018/0018269 A1* | 1/2018 | Jannyavula Venkata | G06F 12/0888 |
| 2018/0275915 A1* | 9/2018 | Ke | G06F 3/0608 |
| 2020/0004676 A1* | 1/2020 | Perlmutter | G06F 3/0631 |
| 2020/0249980 A1 | 8/2020 | Dutta et al. | |

FOREIGN PATENT DOCUMENTS

KR    20170088743    8/2017

OTHER PUBLICATIONS

International Search Report and Written Opinion dated Jul. 7, 2022 in International Patent Application No. PCT/US2022/022194, pp. 1-8.

* cited by examiner

*Primary Examiner* — Hosain T Alam
*Assistant Examiner* — Nicholas A. Paperno
(74) *Attorney, Agent, or Firm* — Byrne Poh LLP

(57) ABSTRACT

Read Quality of Service in a solid state drive is improved by allowing a host system communicatively coupled to the solid state drive to control garbage collection in the solid state drive. Through the use of controlled garbage collection, the host system can control when to start and stop garbage collection in the solid state drive and the number of NAND dies engaged in garbage-collection operations.

20 Claims, 10 Drawing Sheets

HOST CONTROLLED GARBAGE COLLECTION IN A SOLID STATE DRIVE

FIELD

This disclosure relates to solid state drives and in particular to garbage collection in a solid state drive.

BACKGROUND

Non-volatile memory refers to memory whose state is determinate even if power is interrupted to the device. A solid state drive is a storage device that stores data in non-volatile memory. Typically, the solid-state drive includes a block-based memory such as NAND Flash and a controller to manage read/write requests received from a host communicatively coupled to the solid state drive directed to the NAND Flash.

When data stored in a block in a NAND Flash in the solid state drive is no longer needed, data must be erased before one or more blocks storing the data can be used to store new data. Prior to erasing, valid data in the one or more blocks must be written to other blocks in the NAND Flash. The writing of the valid data to other blocks and the NAND Flash erase operation are typically referred to as "garbage" collection (garbage-collection).

BRIEF DESCRIPTION OF THE DRAWINGS

Features of embodiments of the claimed subject matter will become apparent as the following detailed description proceeds, and upon reference to the drawings, in which like numerals depict like parts, and in which:

Figure 1:
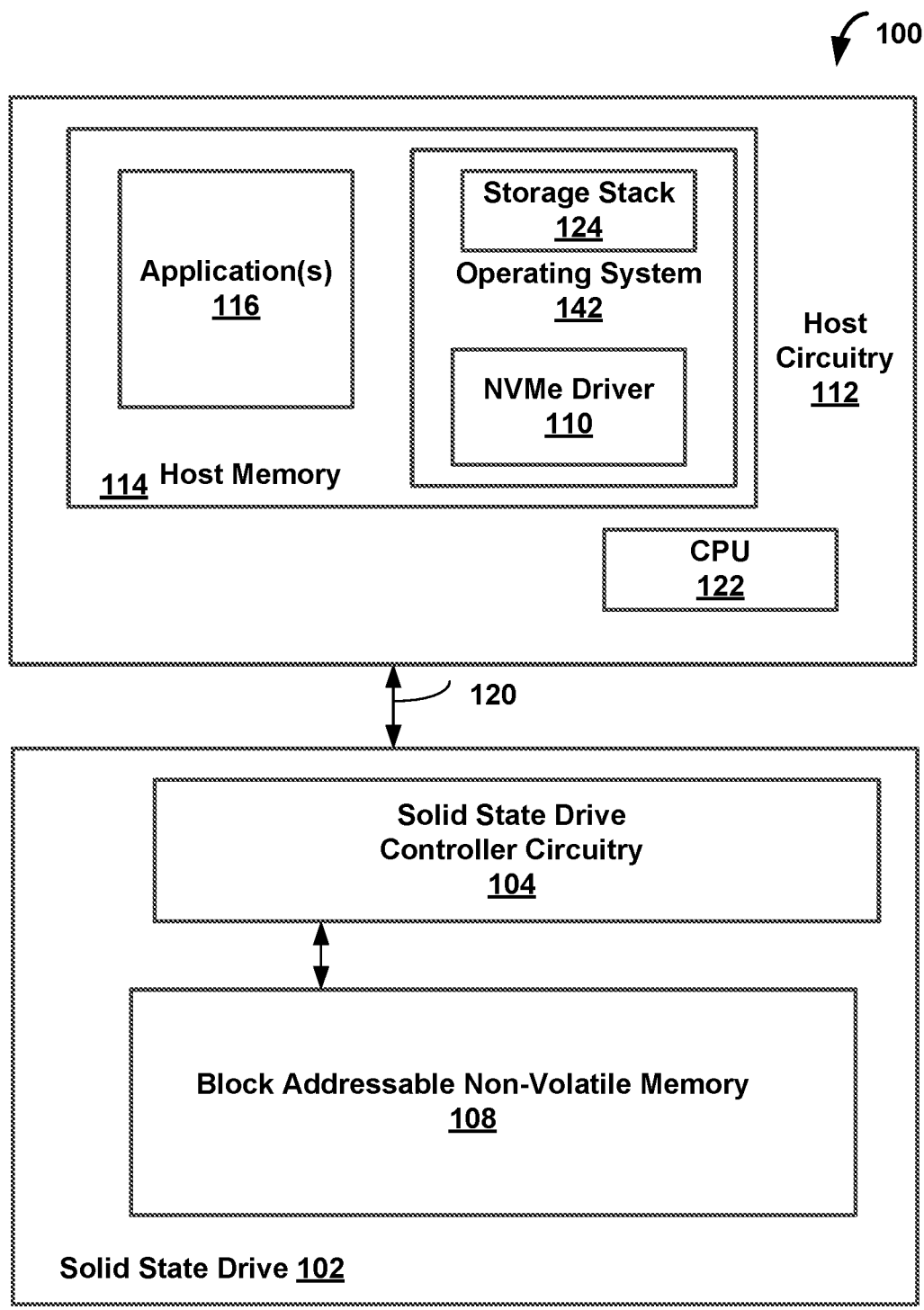
FIG. 1 is a block diagram of a computer system that includes host circuitry communicatively coupled to a solid state drive.

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined as set forth in the accompanying claims.

DESCRIPTION OF EMBODIMENTS

A host system can communicate with a solid state drive (SSD) over a high-speed serial computer expansion bus, for example, a Peripheral Component Interconnect Express (PCIe) bus using a Non-Volatile Memory Express (NVMe) standard protocol. The Non-Volatile Memory Express (NVMe) standard protocol defines a register level interface for host software to communicate with the solid state drive over the Peripheral Component Interconnect Express (PCIe) bus.

The solid state drive can receive Input/Output (I/O) requests from the host system at indeterminate times to perform read and program operations in the NAND memory. The I/O requests can be mixed bursts of read operations and write operations, of varying sizes, queue-depths, and randomness interspersed with idle periods. The processing of the read and program commands for the NAND memory are intermingled internally in the solid state drive with various error handling and error-prevention media-management policies. These, together with the varying invalidity state (number of invalid pages) of the various NAND bands in the solid state drive, makes the internal data-relocations/garbage-collections (GC) in the solid state drive bursty (active periods intermingled with idle periods).

Typically, a solid state drive (SSD) includes independent NAND dies (also referred to a NAND Flash dies) communicatively coupled to a controller to allow parallelization of I/O operations to the NAND dies. A read request received from the host system that is queued behind an ongoing program operation on a NAND die can have a significant impact on the read latency or read Quality of Service (rQoS) of the solid state drive.

Time to perform a program operation in the NAND die is much higher than the time to perform a read operation in the NAND die. A Program Suspend Resume (PSR) feature in the solid state drive allows suspension of an ongoing program operation to service a read operation, however the Program Suspend Resume increases the time required to complete the read operation. Read requests queued behind program requests is the primary cause of lower read QoS (rQoS) at the 99.9 percentile level.

Active periods intermingled with idle periods for garbage-collection operations and NAND program operations in the solid state drive results in bursty NAND program bandwidth. Bursty NAND program bandwidth negatively impacts read Quality of Service, particularly when both garbage-collection bandwidth and host write bandwidth are high. Controlling and improving the read Quality of Service includes controlling read on write collision probability (the probability of a host read request waiting for completion of a host write request), which is dependent on the number of NAND dies being programmed at any time and the maximum number of NAND dies in the solid state drive. This read on write collision probability is proportional to number of NAND dies performing a program operation and the maximum number of NAND dies in the solid state drive. For example, if the solid state drive has 124 NAND dies and all of the NAND dies are concurrently performing a program operation, the read on write collision probability of host reads with host writes (124/124) is 1. If 12 of the 124 NAND dies are performing a program operation, the read on write collision probability (12/124) is 0.1, that is, every host read has a 10 percent chance of colliding with a host write operation.

In an embodiment, read Quality of Service in the solid state drive is improved by allowing a host system communicatively coupled to the solid state drive to control garbage collection in the solid state drive. Through the use of controlled garbage collection, the host system can control when to start and stop garbage-collection in the solid state drive and the number of NAND dies engaged in garbage-collection operations.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

FIG. 1 is a block diagram of a computer system 100 that includes host circuitry 112 communicatively coupled to a solid state drive 102. The host circuitry 112 includes a host memory 114. One or more applications 116 (programs that perform a particular task or set of tasks) and an operating system 142 that includes a storage stack 124 and an NVMe driver 110 may be stored in host memory 114.

An operating system 142 is software that manages computer hardware and software including memory allocation and access to Input/Output (I/O) devices. Examples of operating systems include Microsoft® Windows®, Linux®, iOS® and Android®. In an embodiment for the Microsoft® Windows® operating system, the storage stack 124 may be a device stack that includes a port/miniport driver for the solid state drive 102.

In an embodiment, the host memory 114 is a volatile memory. Volatile memory is memory whose state (and therefore the data stored in it) is indeterminate if power is interrupted to the device. Dynamic volatile memory requires refreshing the data stored in the device to maintain state. One example of dynamic volatile memory incudes DRAM (Dynamic Random Access Memory), or some variant such as Synchronous DRAM (SDRAM). A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, originally published in September 2012 by JEDEC), DDR5 (DDR version 5, originally published in July 2020), LPDDR3 (Low Power DDR version 3, JESD209-3B, August 2013 by JEDEC), LPDDR4 (LPDDR version 4, JESD209-4, originally published by JEDEC in August 2014), LPDDR5 (LPDDR version 5, JESD209-5A, originally published by JEDEC in January 2020), WIO2 (Wide Input/Output version 2, JESD229-2 originally published by JEDEC in August 2014), HBM (High Bandwidth Memory, JESD235, originally published by JEDEC in October 2013), HBM2 (HBM version 2, JESD235C, originally published by JEDEC in January 2020), or HBM3 (HBM version 3 currently in discussion by JEDEC), or others or combinations of memory technologies, and technologies based on derivatives or extensions of such specifications. The JEDEC standards are available at www.jedec.org.

The host circuitry 112 can communicate with the solid state drive 102 over a high-speed serial computer expansion bus 120, for example, a Peripheral Component Interconnect Express (PCIe) bus. The host circuitry 112 manages the communication over the Peripheral Component Interconnect Express (PCIe) bus. In an embodiment, the host system communicates over the Peripheral Component Interconnect Express (PCIe) bus using a Non-Volatile Memory Express (NVMe) standard protocol. The Non-Volatile Memory Express (NVMe) standard protocol defines a register level interface for host software to communicate with the Solid State Drive (SSD) 102 over the Peripheral Component Interconnect Express (PCIe) bus. The NVM Express standards are available at www.nvmexpress.org. The PCIe standards are available at pcisig.com.

The solid state drive 102 includes solid state drive controller circuitry 104, and a block addressable non-volatile memory 108. A request to read data stored in block addressable non-volatile memory 108 in the solid state drive 102 may be issued by one or more applications 116 (programs that perform a particular task or set of tasks) through the storage stack 124 in an operating system 142 to the solid state drive controller circuitry 104.

The solid state drive controller circuitry 104 in the solid state drive 102 queues and processes commands (for example, read, write ("program"), erase commands received from the host circuitry 112 to perform operations in the block addressable non-volatile memory 108. Commands received by the solid state drive controller circuitry 104 from the host interface circuitry 202 can be referred to as Host Input Output (IO) commands.

Figure 2:
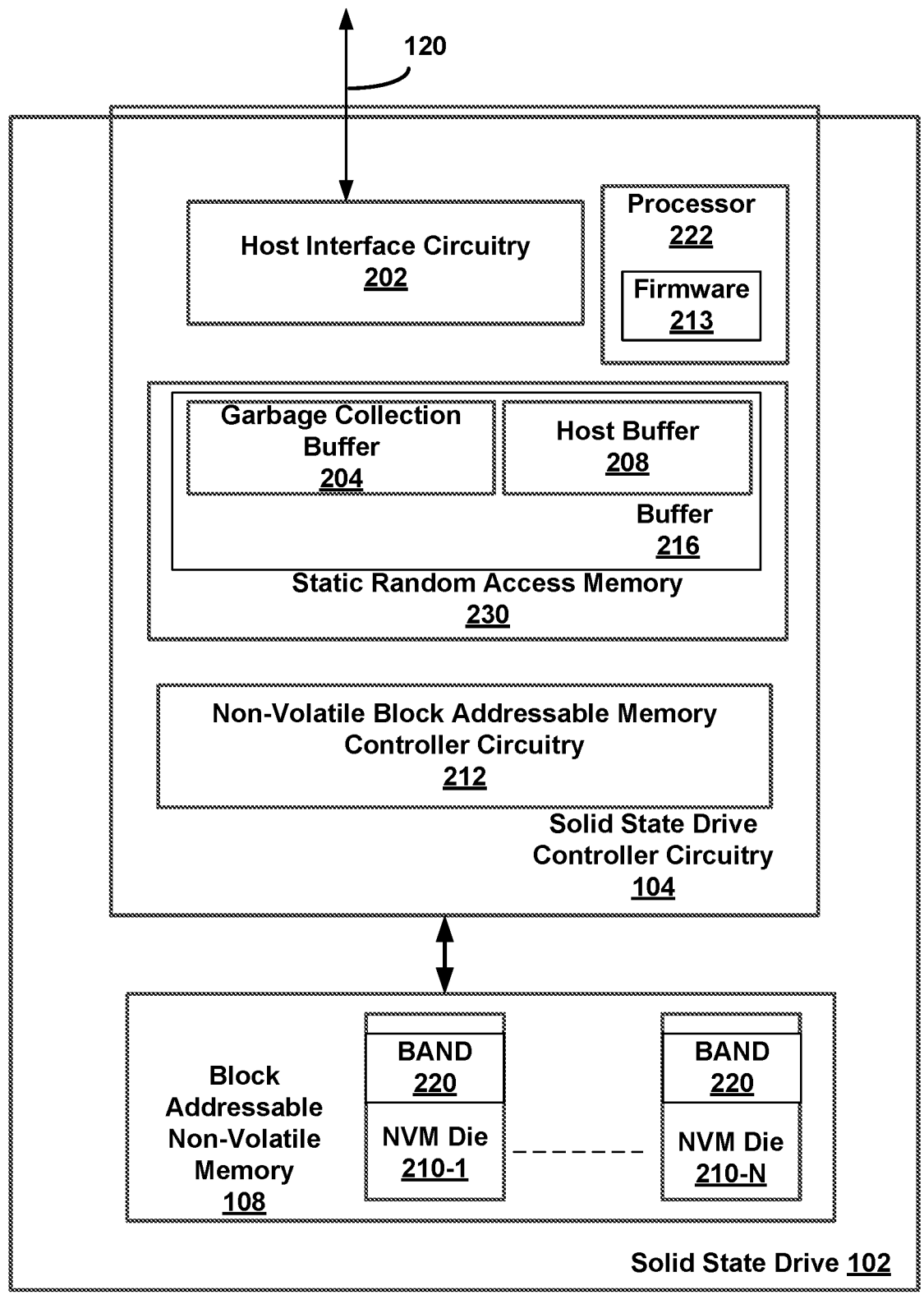
FIG. 2 is a block diagram of an embodiment of the solid state drive in FIG. 1.

FIG. 2 is a block diagram of an embodiment of the solid state drive 102 in FIG. 1. The solid state drive controller circuitry 104 in the solid state drive 102 includes host interface circuitry 202, non-volatile block addressable memory controller circuitry 212, a processor 222, firmware 213 and Static Random Access Memory 230. Firmware 213 can be executed by processor (CPU) 122. The Solid State drive controller circuitry 104 can be included in a Field Programmable Gate Array (FPGA) or an Application Specific Integrated Circuit (ASIC). Firmware 213 can be executed by processor (CPU) 122.

Static Random Access Memory (SRAM) is a volatile memory. Volatile memory is memory whose state (and therefore the data stored in it) is indeterminate if power is interrupted to the device. SRAM is a type of volatile memory that uses latching circuitry to store each bit. SRAM is typically used as buffer memory because in contrast to Dynamic Random Access Memory (DRAM) the data stored in SRAM does not need to be periodically refreshed.

A portion of the static random access memory 230 can be allocated by firmware 213 as a garbage collection buffer 204. Another portion of the static random access memory 230 can be allocated by firmware 213 as a host buffer 208. The ratio of static random access memory 230 allocated to the garbage collection buffer 204 and to the host buffer 208 is proportional to a number of NAND dies (a percentage of the total number of NAND dies in the solid state drive 102) configured for controlled garbage collection in the solid state drive 102. Controlled garbage collection allows the host system to limit the non-volatile memory bandwidth used for garbage collection by controlling the number of NAND dies to perform garbage collection. The number of NAND dies selected to perform garbage collection can be increased when during IO idle time (no host commands queued for NAND) and decreased during IO time (host commands queued for NAND).

The block addressable non-volatile memory 108 is a non-volatile memory. A non-volatile memory (NVM) device is a memory whose state is determinate even if power is interrupted to the device. In one embodiment, the Block Addressable non-volatile memory 108 is a NAND Flash memory, or more specifically, multi-threshold level NAND flash memory (for example, Single-Level Cell ("SLC"), Multi-Level Cell ("MLC"), Tri-Level Cell ("TLC"), Quad-Level Cell ("QLC"), Penta-Level Cell ("PLC") or some other NAND Flash memory).

The block addressable non-volatile memory 108 includes a plurality of non-volatile memory dies 210-1, ... 210-N, for example a NAND Flash die. Typically, data is written (striped) across many NAND Flash die 210-1, ... 210-N in the solid state drive 102 to optimize the write bandwidth to the block addressable non-volatile memory 108. A band 220, which can also be referred to as a stripe spans across all the individual non-volatile memory dies 210-1, ... 210-N and this enables IO bandwidth maximization via parallel IO operations across the non-volatile memory dies 210-1, ... 210-N. Controlling the maximum number of dies used for a garbage collection operation at a given time allows read-on garbage collection write collision probability to be controlled. For example, the percentage of NAND dies used for controlled garbage collection can be selected based on a required read Quality of Service for the solid state drive 102. A garbage collection operations include writing valid pages to other blocks and erasing blocks after valid pages have been rewritten to other blocks.

The non-volatile memory on each of the plurality of non-volatile memory dies 210-1, ..., 210-N includes a plurality of blocks, with each block including a plurality of pages. Each page in the plurality of pages to store data and associated metadata. In an embodiment, the non-volatile memory die has 2048 blocks, each block has 64 pages, and each page can store 2048 bytes of data and 64 bytes of metadata.

NAND memory must be erased before new data can be written which can result in additional NAND operations to move data from a block of NAND memory prior to erasing the block. These additional NAND operations produce a multiplying effect that increases the number of writes required, producing an "amplification" effect, that is referred to as "write amplification." For example, if 3 of 64 pages in a block are valid (in use) and all other pages are invalid (no longer in use), the three valid pages must be written to another block prior to erasing the block resulting in three write page operations in addition to the erase operation and the new data to be written. Write amplification factor is a numerical value that represents the amount of data that the solid state drive controller has to write in relation to the amount of new data to be written that is received from the host circuitry 112.

A TRIM command can be issued by the operating system 142 to inform the solid state drive which pages in the blocks of data are no longer in use and can be marked as invalid. The TRIM command allows the solid state drive 102 to free up space for writing new data to the block addressable non-volatile memory 108. Similarly, overwrites also invalidate previously written data and require relocations to free invalid pages. The solid state drive 102 does not relocate pages marked as invalid to another block in the block addressable non-volatile memory during garbage collection.

The Non-Volatile Block Addressable Memory Controller Circuitry 212 in the solid state drive controller circuitry 104 queues and processes commands (for example, read, write ("program"), erase commands) received from the host system for the block addressable non-volatile memory 108. Data associated with host I/O commands, for example, host read and host write commands received over the PCIe bus 120 from host circuitry 112 are stored in the host buffer 208 in buffer 216.

The garbage collection buffer 204 in buffer 216 is used to store data in pages marked as valid to be relocated to another block in the band 220 in the block addressable non-volatile memory 108 in the solid state drive 102. The data read from the page that is stored in the garbage collection buffer 204 is written (relocated) to another block in a non-volatile memory die 210-1, ... 210-N in the band 220 in block addressable non-volatile memory 108.

A request for a host read operation can be received for a NAND die while a garbage collection read operation to the same NAND die is in process. This can be referred to as a "read on read collision". The "read on read collision" results in an increase in read latency for the host read operation. The read latency includes the time to complete the garbage collection read operation and time to perform error handling (if required).

A request for a host read operation can be received for a NAND die while a garbage collection program operation to the same NAND die is in process. A request for a host read operation can be received for a NAND die while a host program operation to the same NAND die is in process. These can be referred to as a "read on write collisions". A "read on write collision" results in an increase in write latency for the write operations. The write latency includes the time to suspend the program operation, perform the read operation resume the program operation.

In an embodiment, the solid state drive 102 has an Enterprise and Data Center SSD Form Factor (EDSFF) and includes 124 or more NAND dies.

Figure 3:
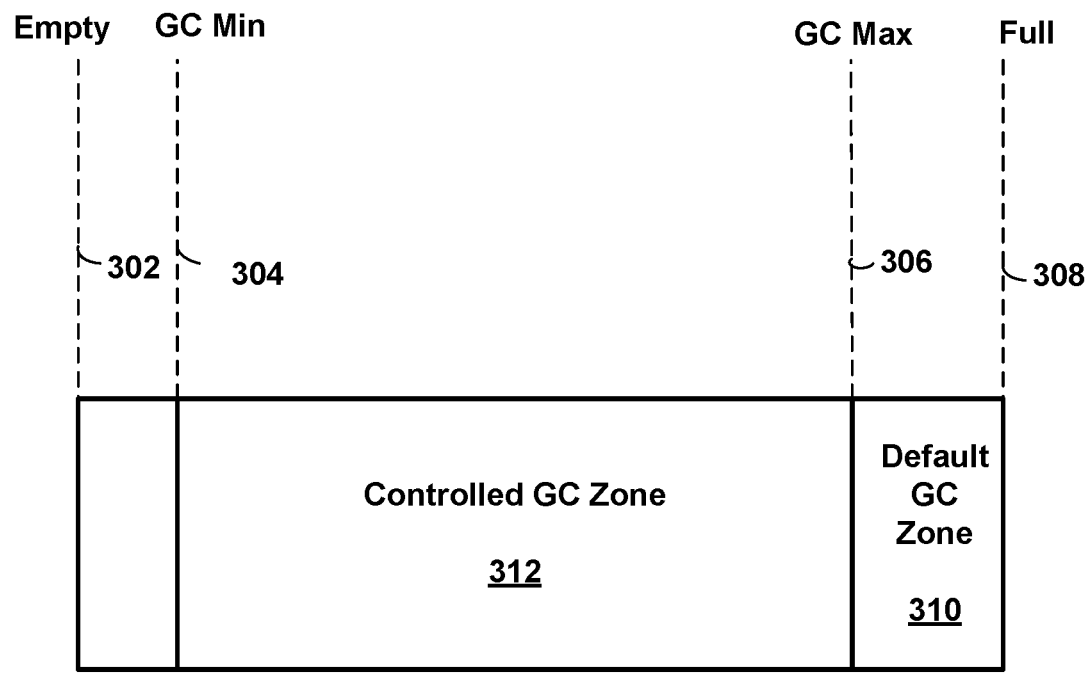
FIG. 3 is a representation of the total capacity of the block addressable non-volatile memory in the solid state drive.

FIG. 3 is a representation of the total capacity of the block addressable non-volatile memory 108 in the solid state drive 102. At position 302, the block addressable non-volatile memory 108 is empty. At position 308, the block addressable non-volatile memory 108 is full. A default garbage collection zone 310 ranges from position 306 to position 308. Default garbage collection is triggered when the solid state drive is almost full, that is, the capacity of the block addressable non-volatile memory 108 that has been used is in the default garbage collection zone 310.

In an embodiment, garbage collection is triggered while the capacity used in the block addressable non-volatile memory 108 is within a controlled garbage collection zone 312. The controlled garbage collection zone 312 ranges from position 304 to position 306. The solid state drive 102 determines the controlled garbage collection zone 312 to allow for the availability of suitable blocks in the block addressable non-volatile memory 108 to relocate within the block addressable non-volatile memory 108 with reasonably high-invalidity and lower write amplification factor.

Figure 4:
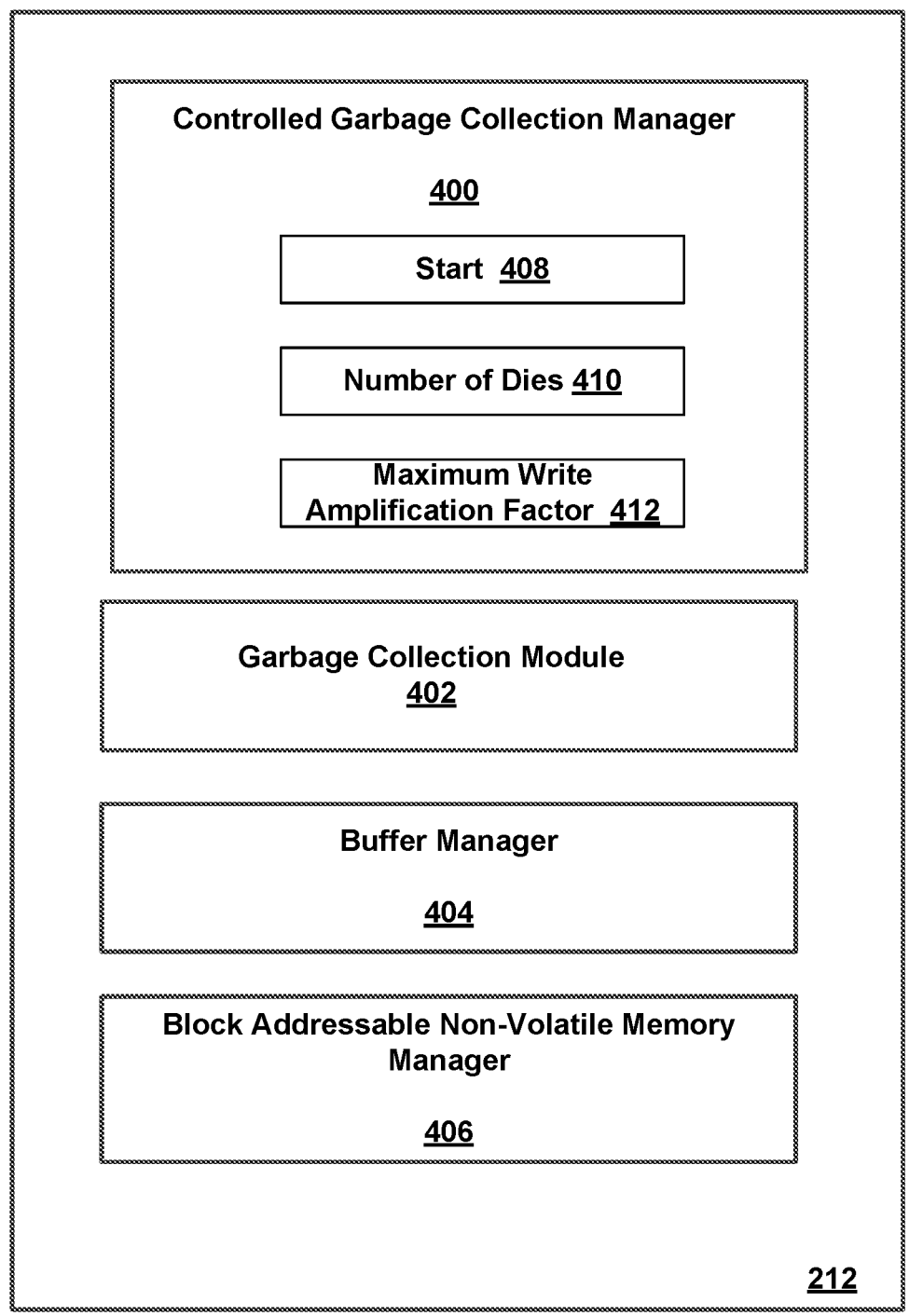
FIG. 4 illustrates components in firmware to perform controlled garbage collection within the controlled garbage collection zone according to the principles of the present invention.

FIG. 4 illustrates components in firmware 213 to perform controlled garbage collection within the controlled garbage collection zone 312 according to the principles of the present invention. The components in firmware 213 include a controlled garbage collection manager 400, a garbage collection module 402, a buffer manager 404 and a block addressable non-volatile memory manager 406. The controlled garbage collection manager 400 includes three parameters configurable by the host circuitry 112 to perform controlled garbage collection in the block addressable non-volatile memory 108. The parameters include a start point 408, number of dies 410 and maximum write amplification factor 412. The start point 408 is a capacity filled position in the block addressable non-volatile memory used to indicate when controlled garbage collection can be started in the block addressable non-volatile memory. The number of dies 410 (also be referred to as a percentage of the NAND dies in the solid state drive 102) is the maximum number of dies that can be concurrently used for controlled garbage collection. The maximum write amplification factor 412 is used to select pages in the block addressable non-volatile memory 108 for controlled garbage collection. These modules/managers will be described later in conjunction with FIGS. 5-8.

Figure 5:
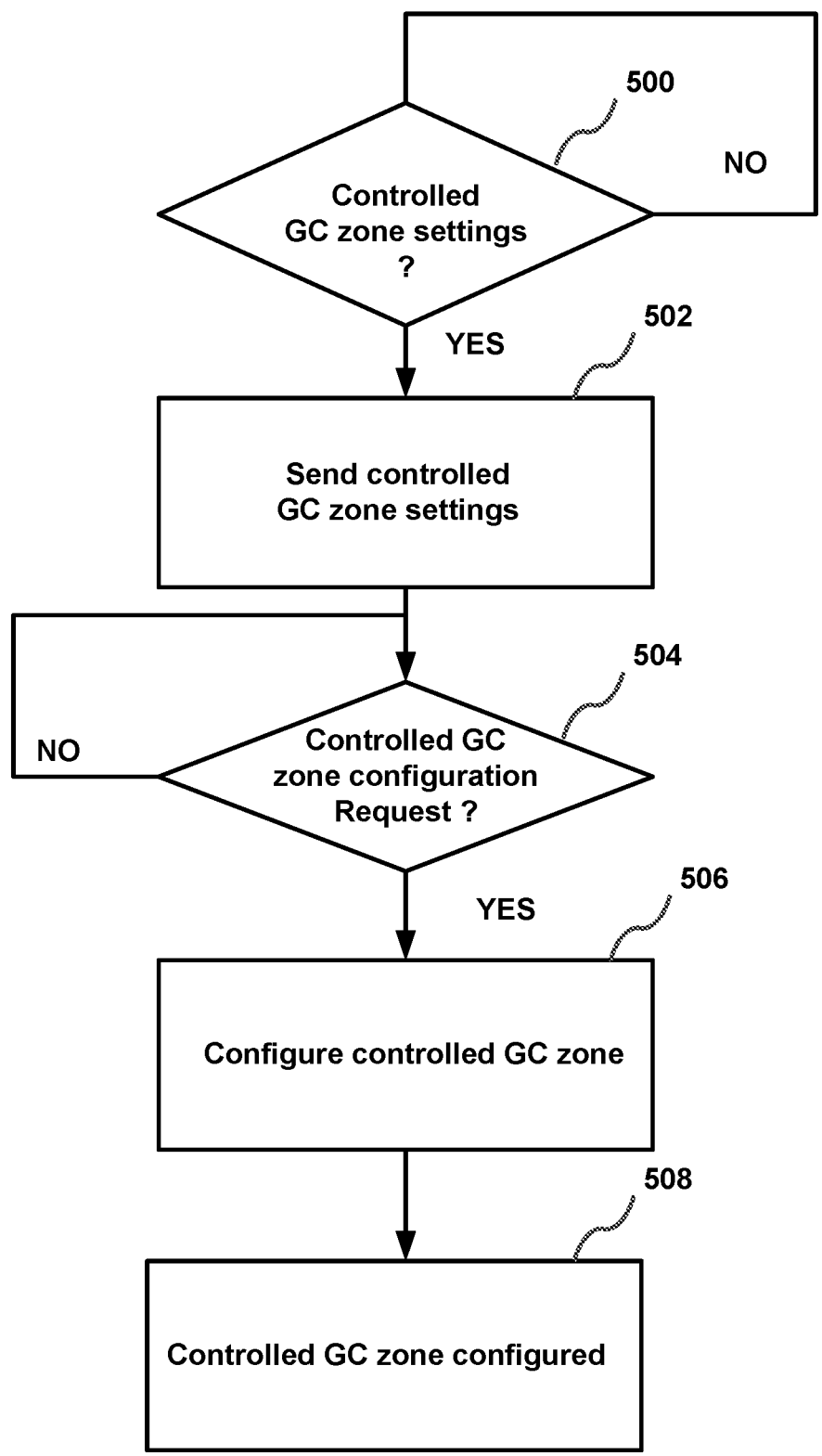
FIG. 5 is a flowgraph illustrating a method to configure the controlled garbage collection manager 400 to perform controlled garbage collection.

FIG. 5 is a flowgraph illustrating a method to configure the controlled garbage collection manager 400 to perform controlled garbage collection.

At block 500, the controlled garbage collection manager 400 waits to receive a request from the host circuitry 112 to retrieve the current settings for position 304 and position 306 in the controlled garbage collection zone 312 shown in FIG. 3. In an embodiment, the request is a vendor unique NVMe command sent over the PCIe bus 120 to the solid state drive 102.

At block 502, in response to receiving the request to retrieve current settings, the controlled garbage collection manager 400 returns the current settings for position 304 and position 306 in the controlled garbage collection zone 312.

At block 504, the controlled garbage collection manager 400 waits to receive a request from the host circuitry 112 to configure controlled garbage collection. The request to configure controlled garbage collection includes the start point 408, the number of dies 410 and the maximum write amplification factor 412.

At block 506, in response to receiving the request to configure controlled garbage collection, the controlled garbage collection manager 400 configures the start point 408, the number of dies 410 and the maximum write amplification factor 412.

At block 508, the controlled garbage collection manager 400 returns a response to the host circuitry 112 indicating that the configuration of the parameters for controlled garbage collection is complete.

Figure 6:
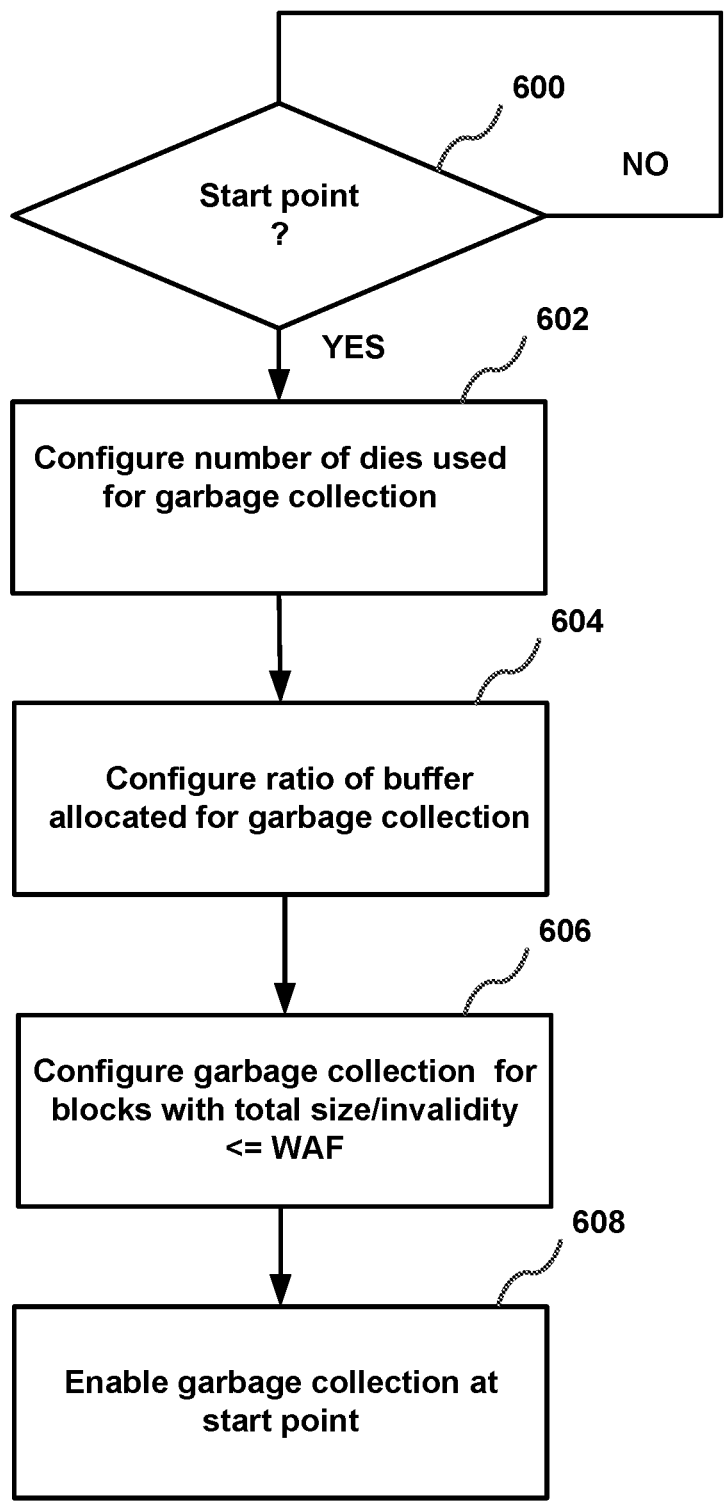
FIG. 6 is a flowgraph illustrating a method performed by the controlled garbage collection manager to configure controlled garbage collection in the solid state drive.

FIG. 6 is a flowgraph illustrating a method performed by the controlled garbage collection manager 400 to configure controlled garbage collection in the solid state drive 102.

At block 600, as data is written to the block addressable non-volatile memory 108 in the solid state drive, the amount of block addressable non-volatile memory 108 that has been used to store data is compared with the start point 408 stored during initialization of the controlled garbage collection manager 400. If the amount of block addressable non-volatile memory 108 used to store data is greater or equal to the start point 408, processing continues with block 602. If not, processing continues with block 600.

At block 602, the number of dies to be used for garbage collection is configured by the controlled garbage collection manager 400. The number of dies to be used for garbage collection is configured based on the maximum percentage of dies that is stored in number of dies 410.

At block 604, the ratio of buffer 216 allocated for garbage collection is configured by the controlled garbage collection manager 400. The portion of memory used for garbage versus the portion of memory used for host write in the buffer 216 is based on percentage of garbage collection dies ratio. The ratio of the buffer 216 allocated to the garbage collection buffer 204 and the host buffer 208 is dependent on the number of dies 410.

At block 606, the controlled garbage collection manager 400 configures in the garbage collection module 402 controlled garbage collection for blocks in NAND dies with invalidity less than or equal to maximum write amplification factor 412.

At block 608, the controlled garbage collection manager 400 enables garbage collection at the start point 408 in the garbage collection module 402.

Figure 7:
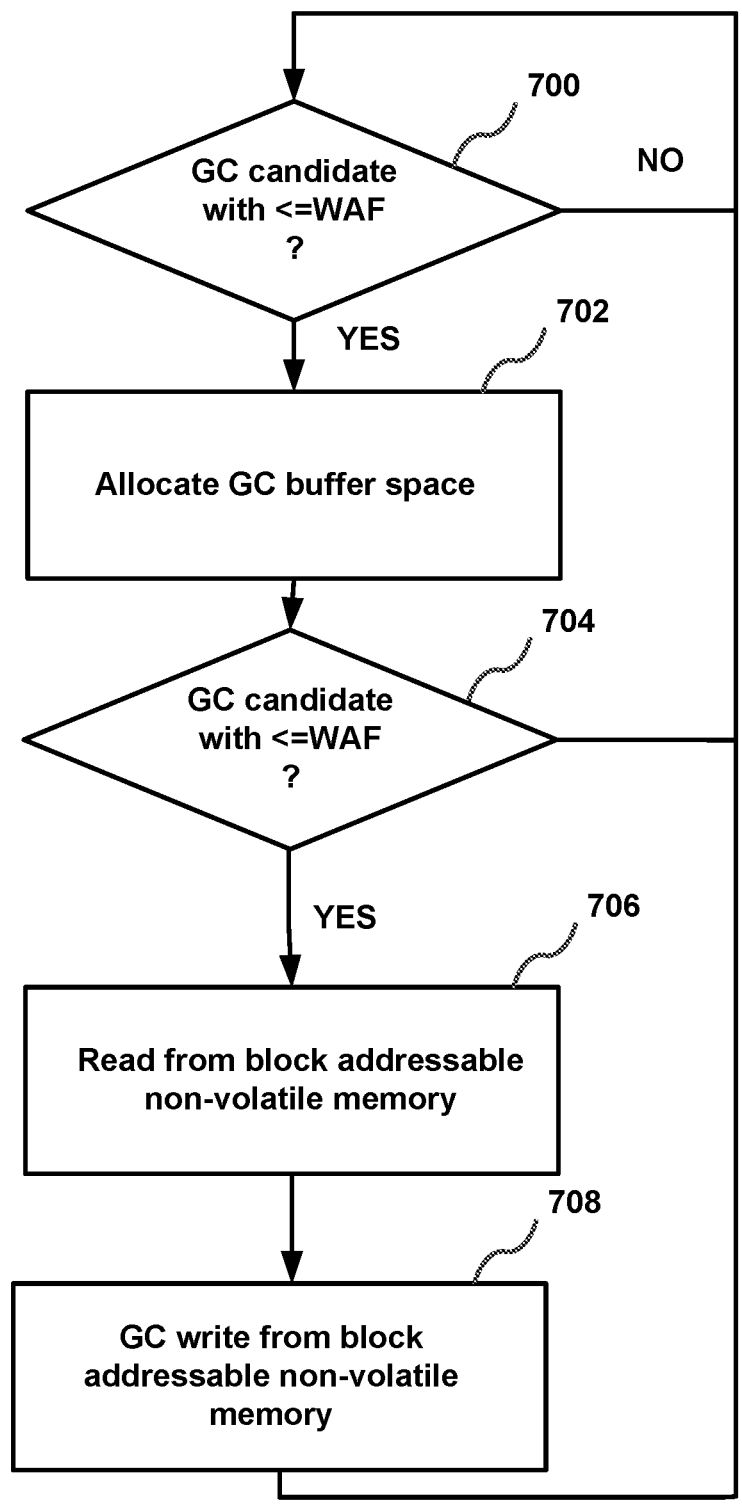
FIG. 7 is a flowgraph illustrating a method to perform controlled garbage collection in the solid state drive.

FIG. 7 is a flowgraph illustrating a method to perform controlled garbage collection in the solid state drive 102.

The controlled garbage collection manager 400 uses the parameters (number of dies 410 and maximum write amplification factor 412) to control the number of NAND dies that are concurrently engaged in write operations for garbage collection and to manage the ratio of static random access memory 230 allocated to the garbage collection buffer 204 and to the host buffer 208.

The garbage collection buffer 204 is allocated only if the percentage of NAND dies 210-1, . . . 210-N with pending garbage collection work items is less than or equal to the percentage NAND dies 210-1, . . . 210-N allocated for garbage collection. Therefore, the upper limit of NAND dies 210-1, . . . 210-N used for garbage collection is controlled by the host. An alternative approach is to instead control the number of NAND dies 210-1, . . . 210-N performing NAND program operations for garbage collection by dispatching a NAND garbage collection program operation only if the percentage of NAND dies performing a NAND program operation is less than or equal to the percentage NAND dies 210-1, . . . 210-N allocated for garbage collection.

The garbage collection module 402 sends a write operation for valid data that is being moved to a NAND die for a garbage collection operation only if the number of NAND dies currently performing writes for garbage collection operations is less than or equal to the number of dies 410. The ratio of the buffer 216 allocated to the garbage collection buffer 204 and the host buffer 208 is dependent on the number of dies 410. Controlling writes based on number of dies allows for the control of host read on garbage collection write collision probability. Host read on garbage collection read collisions can be controlled in similar way. The allocation of the buffer 216 based on the number of dies 410 also controls the host read on garbage collection read collision probability.

At block 700, when the amount of block addressable non-volatile memory 108 used to store data is greater or equal to the start point 408, the garbage collection module 402 looks for garbage collection candidates (blocks) based on number of invalid pages or a write amplification fact that is lower than the host configured value. If a candidate is found, the garbage collection module 402 starts garbage collection, otherwise, the garbage collection module 402 continues to look for garbage collection candidates. The write amplification factor is used to control unnecessary relocations of valid pages in the block addressable non-volatile memory and consequently ensure endurance is not decreased with HCGC.

At block 702, the garbage collection module 402 allocates a portion of the buffer 216 in Static Random Access Memory 230.

At block 704, if the portion of the garbage collection buffer is available, processing continues with block 706. If not, processing continues with block 700.

At block 706, garbage collection module 402 reads GC block(s) from the block addressable non-volatile memory.

At block 708, garbage collection module 402 writes GC block(s) from the candidate block to a destination block in the block addressable non-volatile memory.

In an embodiment, the host triggers the controlled garbage collection operation during a period of low IO to free up block addressable non-volatile memory that is no longer storing valid data due to TRIM or overwrites. A minimum reserved NAND die bandwidth is available for error handling and error prevention. In another embodiment, the host triggers the controlled garbage collection operation during IO idle time. Sustained write bandwidth can vary in complex multi-threaded data center workloads because the write bandwidth to the NAND dies in the solid state drive is divided between host writes and writes for garbage collection.

Figure 8:
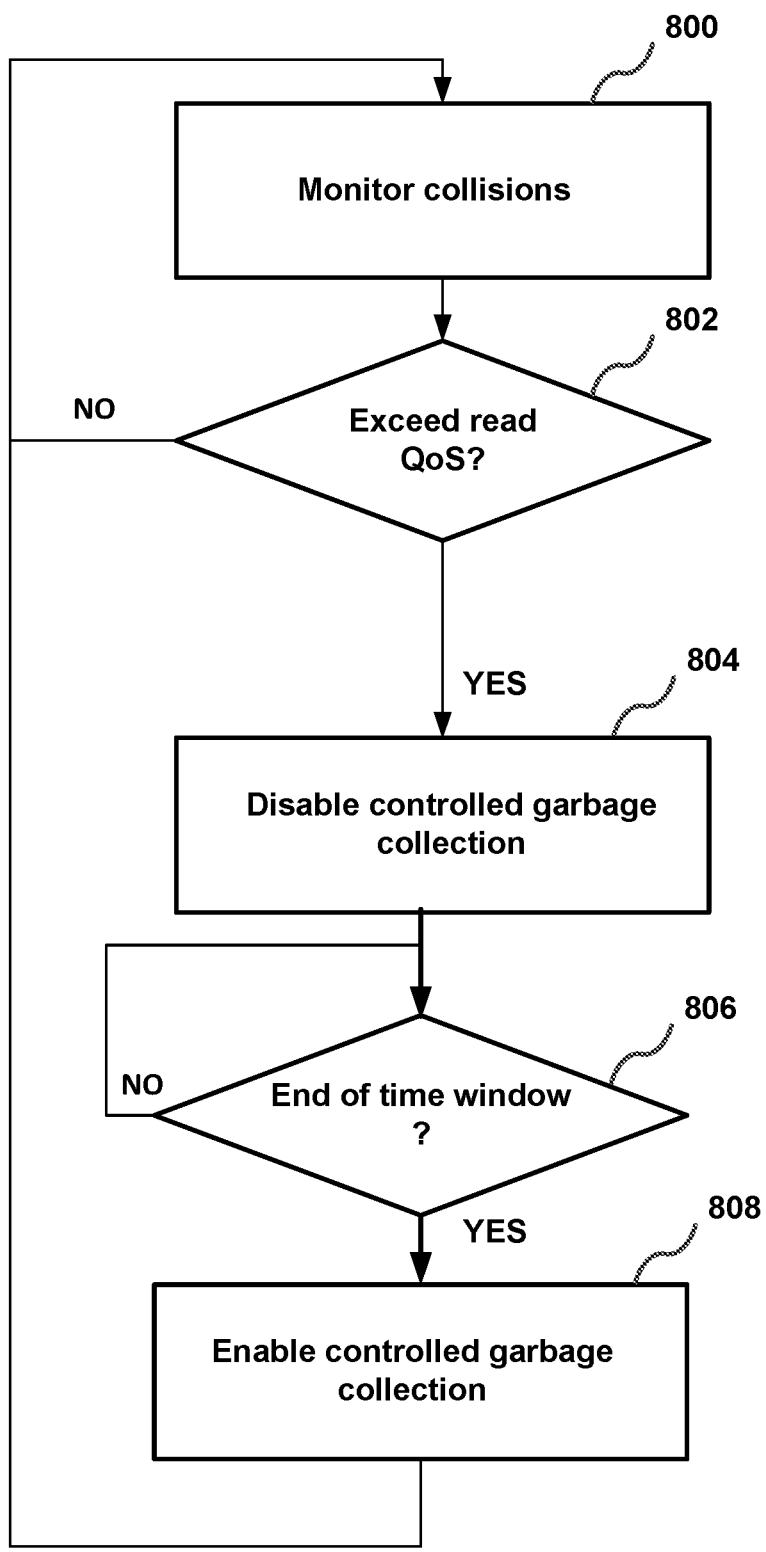
FIG. 8 is a flowgraph illustrating a method performed in the solid state drive to adapt number of dies used for garbage collection and the ratio of buffer used for garbage collection in the solid state drive based on measured read Quality of Service bandwidth utilization during a time window.
Figure 9:
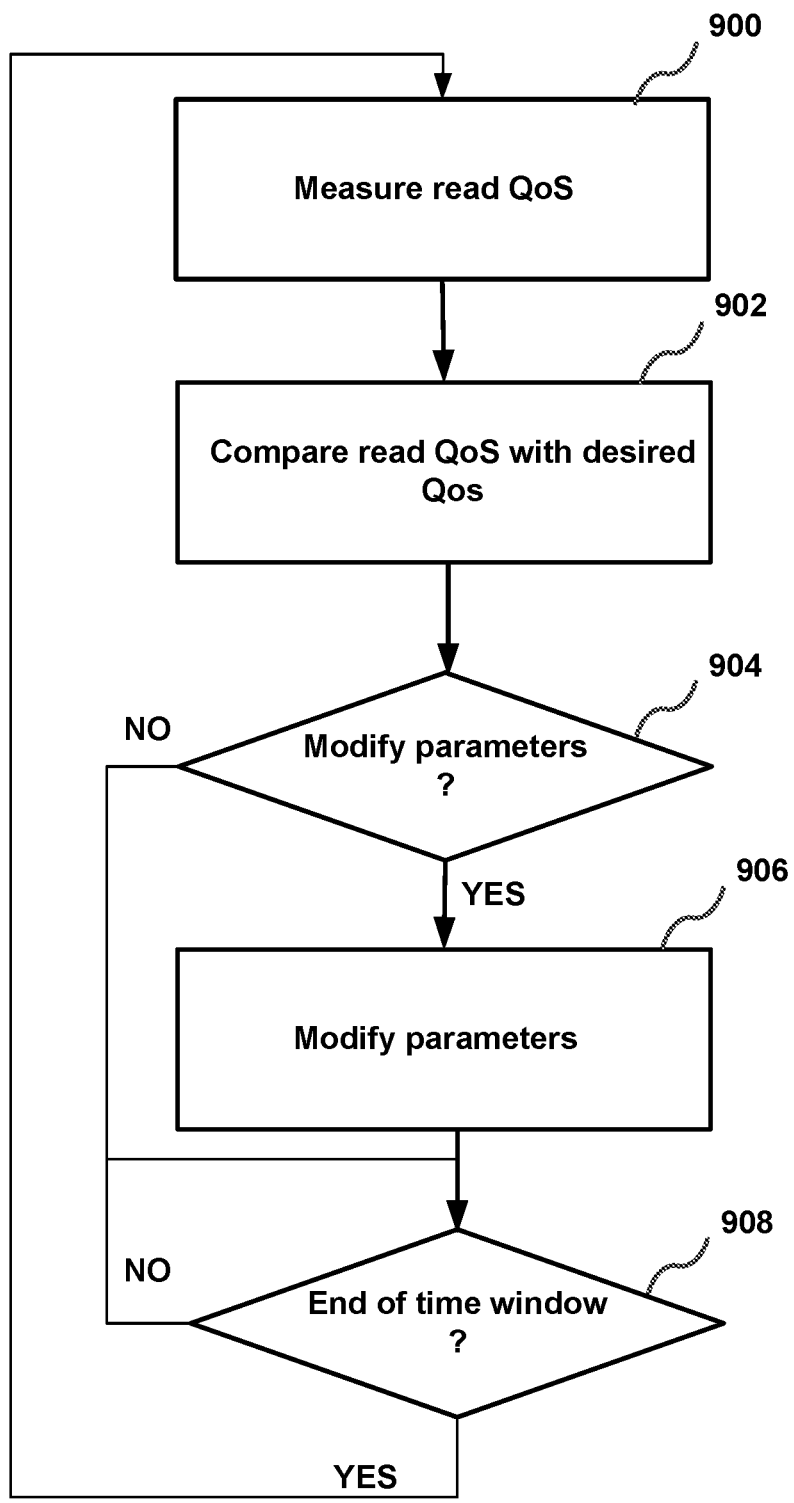
FIG. 9 is a flowgraph illustrating a method performed in the solid state drive to adapt number of dies used for garbage collection and buffer usage inside the solid state drive based on measured read Quality of Service bandwidth utilization using proportional integral derivative control.

FIG. 8 and FIG. 9 illustrate methods to adapt number of dies 410 used for garbage collection and buffer usage in the solid state drive 102 based on internal state in the solid state drive 102 and measured read Quality of Service. The controlled garbage collection control points (number of dies 410 and the ratio of the buffer 216 allocated to the garbage collection buffer 204 and the host buffer 208) are automatically adjusted to optimize NAND die bandwidth utilization while delivering the required read Quality of Service for the solid state drive 102.

The host circuitry 112 configures the start point 408, maximum write amplification factor 412 for the required read Quality of Service for the solid state drive 102. The required read Quality of Service can be configured directly by the host, can be derived from the number of dies 410 configured by the host circuitry 112 or can be derived from read on write collision probability configured by the host circuitry 112.

The number of dies 410 is used to calculate the host required read Quality of Service based on Program Suspend Resume time and the number of reads that are allowed during Program Suspend Resume. The solid state drive 102 can empirically estimate and maintain an internal table of read Quality of Service vs number of dies 410. The solid state drive 102 can empirically estimate and maintain an internal table of read Quality of Service vs read on write probability. The solid state drive 102 can automatically increase and decrease the NAND die bandwidth utilization for garbage collection during periods of low host IO and high host IO. In periods of low host IO NAND die bandwidth use for the garbage collection can be increased by increasing the number of NAND dies to perform controlled garbage collection.

FIG. 8 is a flowgraph illustrating a method performed in the solid state drive 102 to adapt number of dies 410 used for garbage collection and the ratio of buffer 216 used for garbage collection in the solid state drive 102 based on measured read Quality of Service during a time window.

At block 800, the controlled garbage collection module 402 monitors the read Quality of Service or the percentage of host reads that collided with a garbage collection write during a time window (time period) on a rolling basis. In embodiment, the time window is about ten seconds.

At block 802, If the read Quality of Service exceeds the threshold for the requested read Quality of Service, processing continues with block 804. If not, processing continues with block 800.

At block 804, the controlled garbage collection manager 400 disables controlled garbage collection by setting the number of dies 410 to zero.

At block 806, for the remainder of the time window, controlled garbage collection is disabled.

At block 808, at the end of the time window, controlled garbage collection is enabled by setting the number of dies 410 to a non-zero number.

FIG. 9 is a flowgraph illustrating a method performed in the solid state drive 102 to adapt number of dies 410 used for garbage collection and buffer usage inside the solid state drive 102 based on measured bandwidth utilization using proportional integral derivative control.

At block 900, at the end of each time window, the controlled garbage collection manager 400 measures the read Quality of Service. For example, read Quality of Service can be measured by monitoring read latency for host read operations over a period of time.

At block 902, the controlled garbage collection manager 400 compares the current read Quality of Service with the requested read Quality of Service.

At block 904, based on the result of the comparison, the controlled garbage collection manager 400 continues with block 906 to modify the number of dies 410 or with block 908.

At block 906, the controlled garbage collection manager 400 modifies the number of dies using a proportional-integral-derivative (PID) algorithm that calculates an error value as the difference between the requested read Quality of Service and the current read Quality of Service and applies a correction based on proportional, integral and derivative terms.

At block 908, if the time window has expired, processing continues with block 900.

Figure 10:
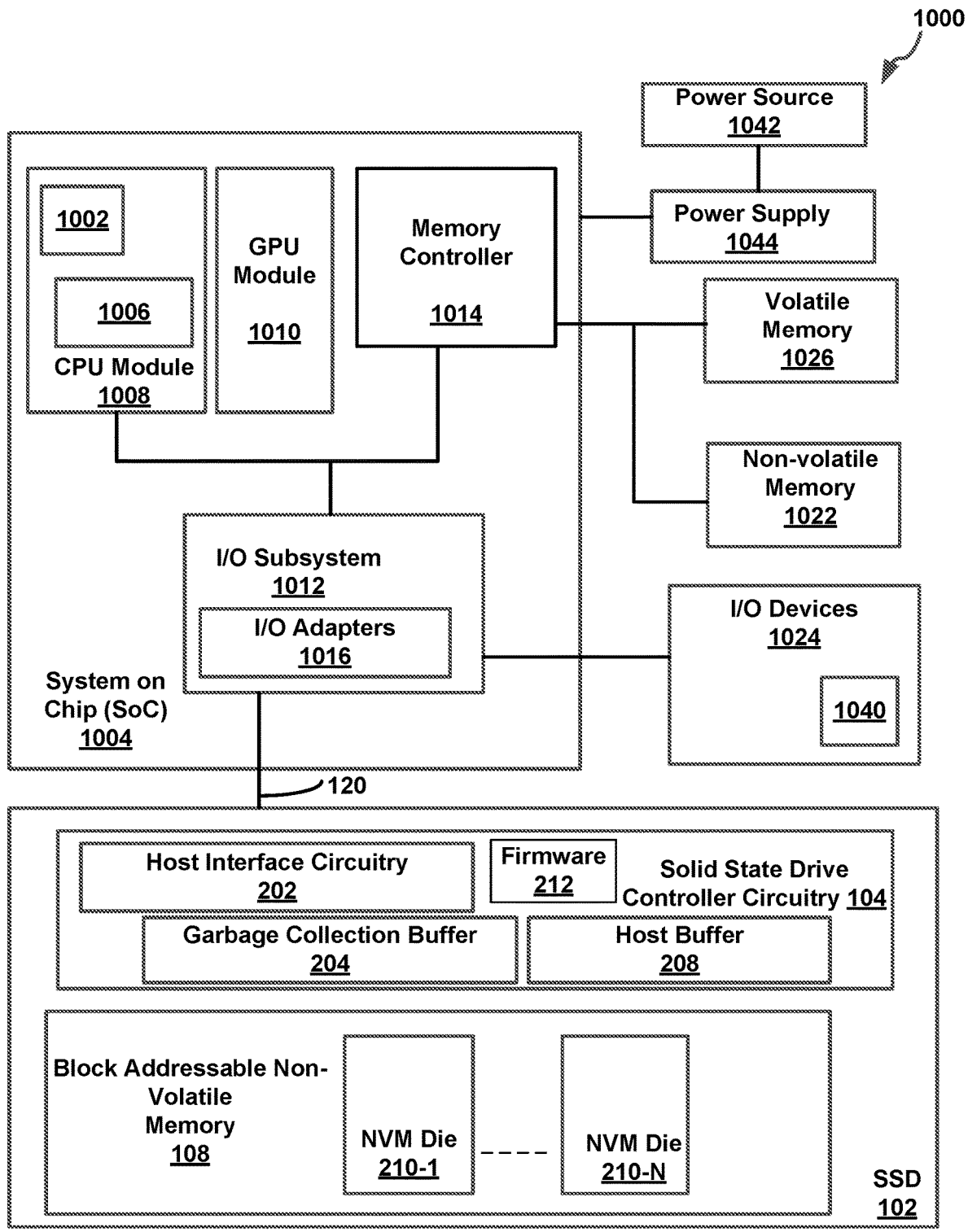
FIG. 10 is a block diagram of an embodiment of a computer system that includes solid state drive.

FIG. 10 is a block diagram of an embodiment of a computer system 1000 that includes solid state drive 102. Computer system 1000 can correspond to a computing device including, but not limited to, a server, a workstation computer, a desktop computer, a laptop computer, and/or a tablet computer.

The computer system 1000 includes a system on chip (SOC or SoC) 1004 which combines processor, graphics, memory, and Input/Output (I/O) control logic into one SoC package. The SoC 1004 includes at least one Central Processing Unit (CPU) module 1008, a memory controller 1014 that can be coupled to volatile memory 1026 and/or non-volatile memory 1022, and a Graphics Processor Unit (GPU) 1010. In other embodiments, the memory controller 1014 can be external to the SoC 1004. The CPU module 1008 includes at least one processor core 1002 and a level 2 (L2) cache 1006.

Although not shown, each of the processor core(s) 1002 can internally include one or more instruction/data caches, execution units, prefetch buffers, instruction queues, branch address calculation units, instruction decoders, floating point units, retirement units, etc. The CPU module 1008 can correspond to a single core or a multi-core general purpose processor, such as those provided by Intel® Corporation, according to one embodiment.

The Graphics Processor Unit (GPU) 1010 can include one or more GPU cores and a GPU cache which can store graphics related data for the GPU core. The GPU core can internally include one or more execution units and one or more instruction and data caches. Additionally, the Graphics Processor Unit (GPU) 1010 can contain other graphics logic units that are not shown in FIG. 10, such as one or more vertex processing units, rasterization units, media processing units, and codecs.

Within the I/O subsystem 1012, one or more I/O adapter(s) 1016 are present to translate a host communication protocol utilized within the processor core(s) 1002 to a protocol compatible with particular I/O devices. Some of the protocols that adapters can be utilized for translation include Peripheral Component Interconnect (PCI)-Express (PCIe); Universal Serial Bus (USB); Serial Advanced Technology Attachment (SATA) and Institute of Electrical and Electronics Engineers (IEEE) 1594 "Firewire".

The I/O adapter(s) 1016 can communicate with external I/O devices 1024 which can include, for example, user interface device(s) including a display and/or a touch-screen display 1040, printer, keypad, keyboard, communication logic, wired and/or wireless, storage device(s) including hard disk drives ("HDD"), solid-state drives ("SSD"), removable storage media, Digital Video Disk (DVD) drive, Compact Disk (CD) drive, Redundant Array of Independent Disks (RAID), tape drive or other storage device. The storage devices can be communicatively and/or physically coupled together through one or more buses using one or more of a variety of protocols including, but not limited to, SAS (Serial Attached SCSI (Small Computer System Interface)), PCIe (Peripheral Component Interconnect Express), NVMe (NVM Express) over PCIe (Peripheral Component Interconnect Express), and SATA (Serial ATA (Advanced Technology Attachment)).

Additionally, there can be one or more wireless protocol I/O adapters. Examples of wireless protocols, among others, are used in personal area networks, such as IEEE 802.15 and Bluetooth, 4.0; wireless local area networks, such as IEEE 802.11-based wireless protocols; and cellular protocols.

The I/O adapter(s) 1016 can also communicate with a solid-state drive ("SSD") 102 which includes solid state drive controller circuitry 104, host interface circuitry 202 and block addressable non-volatile memory 108 that includes one or more non-volatile memory dies 210-1, . . . 210-N. The solid state drive controller circuitry 104 includes firmware 213, garbage collection buffer 204 and host buffer 208.

The I/O adapters 1016 can include a Peripheral Component Interconnect Express (PCIe) adapter that is communicatively coupled using the NVMe (NVM Express) over PCIe (Peripheral Component Interconnect Express) protocol over bus 120 to the host interface circuitry 202 in the solid state drive 102.

Volatile memory is memory whose state (and therefore the data stored in it) is indeterminate if power is interrupted to the device. Dynamic volatile memory requires refreshing the data stored in the device to maintain state. One example of dynamic volatile memory includes DRAM (Dynamic Random Access Memory), or some variant such as Synchronous DRAM (SDRAM). A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, JESD79-4, originally published in September 2012 by JEDEC), DDR5 (DDR version 5, JESD79-5, originally published in July 2020), LPDDR3 (Low Power DDR version 3, JESD209-3B, August 2013 by JEDEC), LPDDR4 (LPDDR version 4, JESD209-4, originally published by JEDEC in August 2014), LPDDR5 (LPDDR version 5, JESD209-5A, originally published by JEDEC in January 2020), WIO2 (Wide Input/Output version 2, JESD229-2 originally published by JEDEC in August 2014), HBM (High Bandwidth Memory, JESD235, originally published by JEDEC in October 2013), HBM2 (HBM version 2, JESD235C, originally published by JEDEC in January 2020), or HBM3 (HBM version 3 currently in discussion by JEDEC), or others or combinations of memory technologies, and technologies based on derivatives or extensions of such specifications. The JEDEC standards are available at www.jedec.org.

An operating system 142 is software that manages computer hardware and software including memory allocation and access to I/O devices. Examples of operating systems include Microsoft® Windows®, Linux®, iOS® and Android®.

Power source 1042 provides power to the components of system 1000. More specifically, power source 1042 typically interfaces to one or multiple power supplies 1044 in system 1000 to provide power to the components of system 1000. In one example, power supply 1044 includes an AC to DC (alternating current to direct current) adapter to plug into a wall outlet. Such AC power can be renewable energy (e.g., solar power) power source 1042. In one example, power source 1042 includes a DC power source, such as an external AC to DC converter. In one example, power source 1042 or power supply 1044 includes wireless charging hardware to charge via proximity to a charging field. In one example, power source 1042 can include an internal battery or fuel cell source.

Flow diagrams as illustrated herein provide examples of sequences of various process actions. The flow diagrams can indicate operations to be executed by a software or firmware routine, as well as physical operations. In one embodiment, a flow diagram can illustrate the state of a finite state machine (FSM), which can be implemented in hardware and/or software. Although shown in a particular sequence or order, unless otherwise specified, the order of the actions can be modified. Thus, the illustrated embodiments should be understood as an example, and the process can be performed in a different order, and some actions can be performed in parallel. Additionally, one or more actions can be omitted in various embodiments; thus, not all actions are required in every embodiment. Other process flows are possible.

To the extent various operations or functions are described herein, they can be described or defined as software code, instructions, configuration, and/or data. The content can be directly executable ("object" or "executable" form), source code, or difference code ("delta" or "patch" code). The software content of the embodiments described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to the disclosed embodiments and implementations of the invention without departing from their scope.

Therefore, the illustrations and examples herein should be construed in an illustrative, and not a restrictive sense. The scope of the invention should be measured solely by reference to the claims that follow.

What is claimed is:

1. A solid state drive comprising:
a plurality of non-volatile memory dies comprising a first portion that is used for garbage collection; and
a buffer used to store data to be written to the plurality of non-volatile memory dies, wherein a first portion of the buffer is used to store data to be written during a garbage collection operation to the first portion of the plurality of non-volatile memory dies, and wherein a second portion of the buffer is used to store a host write command; and
a controller configured to at least:
receive from a host system a command to control a number of dies in the first portion of the plurality of non-volatile memory dies to have a given number of dies;
in response to receiving the command, configure the number of dies in the first portion of the plurality of non-volatile memory dies to have the given number of dies;
in response to configuring the number of dies in the first portion of the plurality of non-volatile memory dies, configure a ratio of a size of the first portion of the buffer to a size of the second portion of the buffer to be proportional to a percentage of a total number of dies in the plurality of non-volatile memory dies used for the first portion of the plurality of non-volatile memory dies.

2. The solid state drive of claim 1, wherein the non-volatile memory dies are NAND dies.

3. The solid state drive of claim 1, wherein the size of the first portion of the plurality of non-volatile memory dies is dependent on a number of Input/Output operations from the host system.

4. The solid state drive of claim 1, wherein a maximum write amplification factor for garbage collection is configured by the host system.

5. The solid state drive of claim 1, wherein the solid state drive is configured to manage a maximum number of block addressable non-volatile memory dies that are used to perform write operations for garbage collection.

6. The solid state drive of claim 1, wherein the solid state drive is configured to manage a ratio between the size of the first portion of the buffer and a size of the second portion of the buffer.

7. The solid state drive of claim 1, wherein the solid state drive is configured to adjust a maximum number of block addressable non-volatile memory dies that are used to perform a garbage collection write operation and a ratio between the size of the first portion of the buffer and a size of the second portion of the buffer based on a state of the solid state drive and a measured read Quality of Service.

8. A method comprising:
storing data in a plurality of non-volatile memory dies comprising a first portion that is used for garbage collection; and
storing, in a buffer, data to be written to the plurality of non-volatile memory dies, wherein a first portion of the buffer is used to store data to be written during a garbage collection operation to the first portion of the plurality of non-volatile memory dies, and wherein a second portion of the buffer is used to store a host write command; and
receiving from a host system a command to control a number of dies in the first portion of the plurality of non-volatile memory dies to have a given number of dies;
in response to receiving the command, configuring the number of dies in the first portion of the plurality of non-volatile memory dies to have the given number of dies;
in response to configuring the number of dies in the first portion of the plurality of non-volatile memory dies, configure a ratio of a size of the first portion of the buffer to a size of the second portion of the buffer to be proportional to a percentage of a total number of dies in the plurality of non-volatile memory dies used for the first portion of the plurality of non-volatile memory dies.

9. The method of claim 8, wherein the non-volatile memory dies are NAND dies.

10. The method of claim 8, wherein the size of the first portion of the plurality of non-volatile memory dies is dependent on a number of Input/Output operations from the host system.

11. The method of claim 8, wherein a maximum write amplification factor for garbage collection is configured by the host system.

12. The method of claim 8, further comprising managing a maximum number of block addressable non-volatile memory dies that are used to perform write operations for garbage collection.

13. The method of claim 8, further comprising managing a ratio between the size of the first portion of the buffer and a size of the second portion of the buffer.

14. The method of claim 8, adjusting a maximum number of block addressable non-volatile memory dies that are used to perform a garbage collection write operation and a ratio between the size of the first portion of the buffer and a size of the second portion of the buffer based on a state of the solid state drive and a measured read Quality of Service.

15. A system comprising:
a processor; and
a solid state drive comprising:
a plurality of non-volatile memory dies comprising a first portion that is used for garbage collection; and
a buffer used to store data to be written to the plurality of non-volatile memory dies, wherein a first portion of the buffer is used to store data to be written during a garbage collection operation to the first portion of the plurality of non-volatile memory dies, and wherein a second portion of the buffer is used to store a host write command; and
a controller configured to at least:
receive from the processor a command to control a number of dies in the first portion of the plurality of non-volatile memory dies to have a given number of dies;

in response to receiving the command, configure the number of dies in the first portion of the plurality of non-volatile memory dies to have the given number of dies;

in response to configuring the number of dies in the first portion of the plurality of non-volatile memory dies, configure a ratio of a size of the first portion of the buffer to a size of the second portion of the buffer to be proportional to a percentage of a total number of dies in the plurality of non-volatile memory dies used for the first portion of the plurality of non-volatile memory dies.

16. The system of claim 15, wherein the size of the first portion of the plurality of non-volatile memory dies is dependent on a number of Input/Output operations from the processor.

17. The system of claim 15, wherein the processor is configured to configure a maximum write amplification factor for garbage collection.

18. The system of claim 15, wherein the solid state drive is configured to manage a maximum number of block addressable non-volatile memory dies that are used to perform write operations for garbage collection.

19. The system of claim 15, wherein the solid state drive is configured to manage a ratio between the size of the first portion of the buffer and a size of the second portion of the buffer.

20. The system of claim 15, further comprising one or more of:
a display communicatively coupled to the processor; or
a battery coupled to the processor.

* * * * *